Patented Dec. 9, 1930

1,784,543

UNITED STATES PATENT OFFICE

HEINRICH BERNHARD RÜDER, OF FRANKFORT-ON-THE-MAIN, GERMANY, ASSIGNOR TO LURGI-GESELLSCHAFT FÜR WÄRMETECHNIK M. B. H., OF FRANKFORT-ON-THE-MAIN, GERMANY

PRODUCTION OF ADSORBENTS

No Drawing. Application filed October 22, 1927, Serial No. 228,110, and in Germany November 11, 1926.

It has been found that the flue dust carried by the waste gases from all kinds of furnaces can advantageously be used as adsorbent material, for example, in the decolorizing and clarifying of liquids; it is also applicable as adsorbent material for the separation of gases and vapors from gases and gas-vapor mixtures. By the term "furnaces" is meant not only the ordinary boiler furnaces of all kinds, but also powdered coal burners and combustion chambers, as well as gas generators, coke ovens and the like. The flue dust from the combustion of lignites has been found to be especially useful as an adsorbent. The adsorptive properties of the flue dust are conditioned by the removal by oxidation of greater or less amounts of the carbon present in the original fuel so that the active carbon produced contains more or less large amounts of ash.

The flue dust comprises particles of different kinds which are suitable for diverse adsorptive purposes depending on their differing ash content, carbon content, particle size and other properties. For this reason it is particularly desirable to make such a separation of the material at the time when it first settles or is precipitated so that a classification with respect to the adsorptive properties is obtained. It is possible to obtain the desired qualities by a differential separation without the construction of any special apparatus for the purpose.

There are various possibilities of providing for the differential separation of the various kinds of material in connection with the construction of flue dust separators or precipitators. For instance, such a classification may be made by the use of simple baffling arrangements such as the baffles or louvres of ordinary flue dust settling chambers. Likewise the particles may be separated for the purpose mentioned above by the use of the so-called wet-precipitators, which depend on trickling water or injected steam. The possibility of classification is considerably improved by the use of devices which separate the flue dust by the application of cyclone, centrifugal, electrical or magnetic effects.

The manner in which the separation and the classification of the separated material can be effected, may be illustrated by an example of such a separation conducted in the electrical way.

For the purification of waste gases from furnaces one or more simple electrode chambers are usually constructed in the flue and the electrically precipitated particles are drawn off into storage bunkers. By a suitable subdivision of such a chamber, as by the arrangement of several precipitating electrodes successively (with respect to the flow of gas), and especially by a suitable subdivision of the dust outlets, the desired differential separation of the precipitated material may be effected. In this way it has been found that an actual differential separation of the material in the different containers or bunkers is effected not only with respect to particle size and weight, as might at first be expected, but also with respect to ash content, carbon content, structural differences, etc., according to the method of carrying out the precipitation as by varying the distance between the electrode, the potential, etc. This action can be effected by regulation of the type of combustion in the furnace or by mixing or not air or other gases with the combustion gases or by changing other features which affect the process.

The economic advantage which such a recovery of adsorbent material offers does not need to be especially stressed since it is apparent it renders unnecessary the special technical operations otherwise required for the production of such material. Moreover, the process of the present invention is particularly characterized by the possibility of separating the desired quality of material from the flue dust at will, particularly by the suitable regulation of the combustion process.

In this way adsorbents of especial economic value are obtained. It is obviously possible to produce an adsorbent of highly special properties by subjecting the material obtained by this process to further treatments, such as extraction, activation, etc., in order to produce a product suitable for particular uses.

The invention is not limited to any particular method of recovering the flue dust of the gases, nor to any particular source of such gases, nor to any particular method of differential separation, nor to any specific product of such differential separation excepting as is indicated in the appended claims. As stated, practically all combustion gases and practically all known methods of recovering the flue dust are available, and the application of the various known differential separation methods are within the skill of a technician. The qualities of the separated products cannot be predetermined but by simple experiment one may recover specific products particularly suited for a great variety of specific uses.

The following is an illustrative example:

The furnace of a boiler for example a steps grate furnace fired with ordinary lignite is operated in such a manner, that it burns with light, as little as possible covered flame. The draft in the furnace is regulated in such a manner, that an even fire is obtained and preferably only a small excess of oxygen is used for the combustion. In the flues of the boiler, the economizer and the furnace there are then collected certain amounts of flue ashes. By taking samples and analysis of these flue ashes one may find those places in the flues, where the best activated substance is deposited. It has been found, that in normal boilers the flue connection to the stack always contains highly active products, which are especially adapted for absorption purposes. The flue ashes obtained at other places of the boiler arrangement may also be employed according to their activity, if necessary after an activating treatment.

By arranging in the flues the known, electrically driven devices for precipitating solid particles from gases, which consist of several plate chambers in series, of which each is provided with a separate outlet, one may obtain the flue dust in different fractions of varying qualities with respect to activity, size of granulation, color, content of ashes, content of combustible substances such as carbon and the like. By testing the different fractions one may find out the best activated substances and the special purposes, for which they may be used.

The adsorbents obtained according to the invention may be subjected to an after-treatment for example washing with water or acids for removing for example sulfur compounds, thereby improving their qualities and making them adapted for special purposes.

It has already been proposed to use ashes obtained by combustion as adsorbents. The present invention does not refer to the use of these ashes, but to the employment of those solid particles of combustion processes, which are carried along by the gaseous combustion products.

The term "flue dust" in the specification and in the following claims is intended to denote the pulverulent to granular particles containing carbon and incombustible matter carried along by the gaseous products of the combustion of solid carbonaceous fuels with an excess of air in all kinds of furnaces.

I claim:

1. As a new adsorbent material, flue dust from all kinds of furnaces.

2. As a new adsorbent material, flue dust produced by the combustion of lignite.

3. A process for the production of adsorbent materials which comprises the differential separation of flue dust from all kinds of furnaces into various grades during the precipitation of the flue dust from the waste furnace gases.

4. A process for the production of adsorbent materials which comprises the differential separation of flue dust from all kinds of furnaces into various grades during the precipitation of the flue dust from the waste furnace gases and the subjection of the separated material to after treatment.

5. A process for the production of adsorbent materials which comprises the differential separation of flue dust from all kinds of furnaces into various grades during the precipitation of the flue dust from the waste furnace gases and the subjection of the separated material to an extraction process.

6. As a new adsorbent material, the product obtained by the differential separation into fractions of varying activity of flue dust produced by the combustion of solid carbonaceous fuel.

7. As a new adsorbent material, the product obtained by the differential separation into fractions of varying activity of flue dust produced by the combustion of lignite.

In testimony whereof, I affix my signature.

HEINRICH BERNHARD RÜDER.

CERTIFICATE OF CORRECTION.

Patent No. 1,784,543.  Granted December 9, 1930, to

HEINRICH BERNHARD RUDER.

It is hereby certified that error appears in the printed specification of the above numbered patent requiring correction as follows: Page 2, line 37, for the misspelled word "absorption" read adsorption; and that the said Letters Patent should be read with this correction that the same may conform to the record of the case in the Patent Office.

Signed and sealed this 20th day of January, A. D. 1931.

(Seal)

M. J. Moore,
Acting Commissioner of Patents.